United States Patent
Lee et al.

(10) Patent No.: US 9,442,533 B2
(45) Date of Patent: Sep. 13, 2016

(54) TRIAXIAL GEAR-TYPED HINGE ASSEMBLY AND RELATED ELECTRONIC DEVICE

(71) Applicant: SHIN ZU SHING CO., LTD., New Taipei (TW)

(72) Inventors: Chung-Yu Lee, New Taipei (TW); Tsung-Yang Tsai, New Taipei (TW); Shun-Yu Hung, New Taipei (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 31 days.

(21) Appl. No.: 14/585,276

(22) Filed: Dec. 30, 2014

(65) Prior Publication Data

US 2016/0187934 A1 Jun. 30, 2016

(51) Int. Cl.
*G06F 1/16* (2006.01)
*E05D 3/06* (2006.01)
*E05D 11/00* (2006.01)

(52) U.S. Cl.
CPC ............... *G06F 1/1681* (2013.01); *E05D 3/06* (2013.01); *E05D 11/00* (2013.01); *G06F 1/1618* (2013.01)

(58) Field of Classification Search
CPC ....... G06F 1/1681; E05D 3/06; E05D 11/00; E05D 3/122; Y10T 16/547; Y10T 16/541
See application file for complete search history.

(56) References Cited

U.S. PATENT DOCUMENTS

| | | | |
|---|---|---|---|
| 6,925,684 B2* | 8/2005 | Kang | G06F 1/1616 16/264 |
| 7,765,644 B2* | 8/2010 | Ueyama | G06F 1/1616 16/354 |
| 8,104,144 B2* | 1/2012 | Wang | G06F 1/1681 16/354 |
| 8,205,305 B2* | 6/2012 | Wang | G06F 1/1681 16/354 |
| 8,369,085 B2 | 2/2013 | Hu | |
| 8,474,101 B2* | 7/2013 | Wang | G06F 1/1681 16/354 |
| 8,578,561 B2* | 11/2013 | Chuang | G06F 1/1681 16/354 |
| 8,713,757 B2* | 5/2014 | Chen | G06F 1/1616 16/327 |
| 8,782,853 B2* | 7/2014 | Ge | G06F 1/1681 16/354 |
| 2007/0054710 A1 | 3/2007 | Pan | |
| 2009/0070961 A1* | 3/2009 | Chung | E05D 3/122 16/354 |
| 2011/0157780 A1* | 6/2011 | Wang | G06F 1/1681 361/679.01 |
| 2011/0271486 A1* | 11/2011 | Wang | G06F 1/1681 16/319 |
| 2011/0289728 A1* | 12/2011 | Wang | E05D 3/122 16/337 |
| 2012/0042473 A1* | 2/2012 | Wang | G06F 1/1681 16/319 |

(Continued)

FOREIGN PATENT DOCUMENTS

TW 201129298 A 8/2011
TW 201218924 A 5/2012

*Primary Examiner* — Courtney Smith
*Assistant Examiner* — Keith Depew
(74) *Attorney, Agent, or Firm* — Alan D. Kamrath; Kamrath IP Lawfirm, P.A.

(57) ABSTRACT

A triaxial gear-typed hinge assembly includes a first axle, a second axle, a third axle, a first supporting component, a second supporting component, a first linking component and a second linking component. The first supporting component includes a first gear hinged to the first axle. The second supporting component includes a second gear hinged to the second axle. The first linking component includes a first linking gear and a first tube connected to the first linking gear. The first linking gear is hinged to the third axle and engaged with the first gear, and the first tube is hinged to the second axle. The second linking component includes a second linking gear and a second tube connected to the second linking gear. The second linking gear is hinged to the third axle and engaged with the second gear, and the second tube is hinged to the first axle.

9 Claims, 6 Drawing Sheets

(56) References Cited

U.S. PATENT DOCUMENTS

| | | | | |
|---|---|---|---|---|
| 2012/0096678 A1* | 4/2012 | Zhang | ............... | G06F 1/1681 16/302 |
| 2013/0139355 A1* | 6/2013 | Lee | ............... | H04M 1/022 16/354 |
| 2013/0187525 A1* | 7/2013 | Chuang | ............... | G06F 1/1681 312/326 |
| 2013/0219661 A1* | 8/2013 | Ge | ............... | G06F 1/1681 16/367 |
| 2014/0174226 A1* | 6/2014 | Hsu | ............... | E05D 3/122 74/98 |
| 2015/0245511 A1* | 8/2015 | Hsu | ............... | E05D 3/122 74/63 |
| 2015/0345195 A1* | 12/2015 | Park | ............... | F16C 11/10 16/354 |
| 2015/0362956 A1* | 12/2015 | Tazbaz | ............... | G06F 1/1637 361/679.27 |
| 2016/0048174 A1* | 2/2016 | Hsu | ............... | G06F 1/1681 16/342 |

* cited by examiner

TRIAXIAL GEAR-TYPED HINGE ASSEMBLY AND RELATED ELECTRONIC DEVICE

BACKGROUND OF THE INVENTION

1. Field of the Invention

The present invention relates to a hinge assembly and, more particularly, to a triaxial gear-typed hinge assembly and a related electronic device.

2. Description of the Prior Art

With the advanced technology, the electronic device (such as the portable device) includes the touch panel and can be the notebook computer with the tablet computer mode. The electronic device further includes the first body and the second body. The first body is an upper cover whereon the touch panel is disposed, and the second body is a bottom cover whereinside the electronic components, the battery, and the keyboard are installed. The first body and the second body can be rotated back by back to position the screen on the first body outward, so the electronic device can be switched from the notebook computer mode to the tablet computer mode. A conventional dual-axle gear-typed hinge assembly of the electronic device includes the first axle, the second axle and the gear structure. The first axle and the second axle are respectively connected to the first body and the second body of the electronic device. The first axle and the second axle can rotate within a range between 0-360 degrees by the gear structure. Thus, the first body can be folded and unfolded relative to the second body from 0 degrees to 360 degrees.

SUMMARY OF THE INVENTION

The present invention provides a triaxial gear-typed hinge assembly and a related electronic device for solving the above drawbacks. A first body and a second body of the electronic device can rotate within a range between 0-360 degrees by the triaxial gear-typed hinge assembly.

According to the invention, a triaxial gear-typed hinge assembly includes a first axle, a second axle, a third axle, a first supporting component, a second supporting component, a first linking component and a second linking component. The first axle, the second axle and the third axle are arranged in parallel. The first supporting component includes a first gear hinged to the first axle. The second supporting component includes a second gear hinged to the second axle. The first linking component includes a first linking gear and a first tube connected to the first linking gear. The first linking gear is hinged to the third axle and engaged with the first gear, and the first tube is hinged to the second axle. The second linking component includes a second linking gear and a second tube connected to the second linking gear. The second linking gear is hinged to the third axle and engaged with the second gear, and the second tube is hinged to the first axle.

According to the invention, the triaxial gear-typed hinge assembly further includes a first connecting component and a second connecting component arranged in parallel. Two ends of the first connecting component are respectively hinged to the first axle and the third axle. Two ends of the second connecting component are respectively hinged to the second axle and the third axle.

According to the invention, the first supporting component, the second supporting component, the first linking component and the second linking component are buckled between the first connecting component and the second connecting component.

According to the invention, a first contacting portion is disposed on an end of the first axle, the first gear contacts against the first contacting portion, a second contacting portion is disposed on an end of the second axle, the first tube contacts against the second contacting portion, a third contacting portion is disposed on an end of the third axle, and the first linking gear contacts against the third contacting portion.

According to the invention, the triaxial gear-typed hinge assembly further includes at least one torsion kit disposed on the first axle or the second axle. The torsion kit includes a resilient component and a fixing component. The resilient component is buckled between the fixing component and the second tube, or between the fixing component and the second gear.

According to the invention, the torsion kit further includes two gaskets. One of the two gaskets is disposed between the resilient component and the fixing component, and the other gasket is disposed between the resilient component and the second tube or between the resilient component and the second gear.

According to the invention, the triaxial gear-typed hinge assembly further includes a first connecting component, a second connecting component parallel to the first connecting component, and at least one torsion kit disposed on the first axle or the second axle. The torsion kit includes a resilient component and a fixing component. An end of the first connecting component is hinged to the first axle and buckled between the first contacting portion and the first gear, and the other end of the first connecting component is hinged to the third axle and buckled between the third contacting portion and the first linking gear. An end of the second connecting component is hinged to the second axle and buckled between the second gear and the resilient component, and the other end of the second connecting component is hinged to the third axle and contacts against the second linking gear. The resilient component is buckled between the fixing component and the second tube, or between the fixing component and the second connecting component.

According to the invention, the torsion kit further includes two gaskets. One of the two gaskets is disposed between the resilient component and the fixing component, and the other gasket is disposed between the resilient component and the second tube or between the resilient component and the second connecting component.

According to the invention, an electronic device includes a first body, a second body, and a foresaid triaxial gear-typed hinge assembly. The first supporting component further includes a first fixing arm connected to an end of the first gear and the first body, and the second supporting component further includes a second fixing arm connected to an end of the second gear and the second body.

According to the invention, the triaxial gear-typed hinge assembly utilizes the first axle, the second axle and the third axle to form the triaxial design, and pivots the first supporting component, the second supporting component, the first linking component and the second linking component to the first/second/third axles respectively. The first supporting component can rotate relative to the second supporting component within a range between 0-360 degrees, and the electronic device having the triaxial gear-typed hinge assembly can rotate the first body relative to the second body within the range between 0-360 degrees. Due to motions between the first supporting component, the second supporting component, the first linking component and the second linking component, the triaxial gear-typed hinge assembly and the related electronic device have advantages of easy operation and smooth rotation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
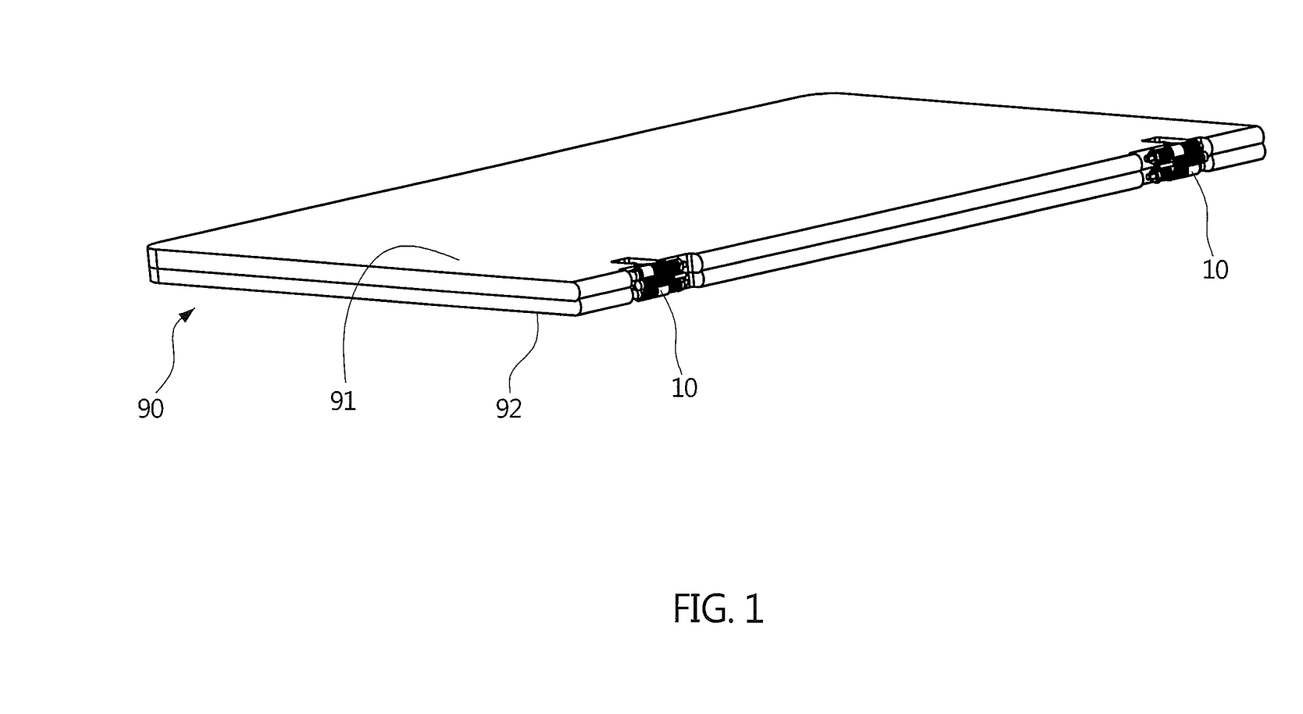
FIG. 1 is a diagram of an electronic device according to a preferred embodiment of the present invention.

Please refer to FIG. 1. FIG. 1 is a diagram of an electronic device 90 according to a preferred embodiment of the present invention. The electronic device 90 can be, but is not limited to, a notebook computer which can be applied as a tablet computer. The electronic device 90 includes a first body 91, a second body 92 and two triaxial gear-typed hinge assemblies 10. The first body 91 is an upper cover with a touch panel. The second body 92 is a bottom cover whereinside electronic components, a battery and a keyboard are disposed. The two triaxial gear-typed hinge assemblies 10 are connected between the first body 91 and the second body 92 in symmetry. The first body 91 can be folded and unfolded relative to the second body 92 by the triaxial gear-typed hinge assembly 10, and a rotary range between the first body 91 and the second body 92 can be within 0-360 degrees. The electronic device 90 is closed while an angle between the first body 91 and the second body 92 equals zero degrees. The electronic device 90 can be applied as the tablet computer mode while the angle between the first body 91 and the second body 92 equals 360 degrees.

Figure 2:
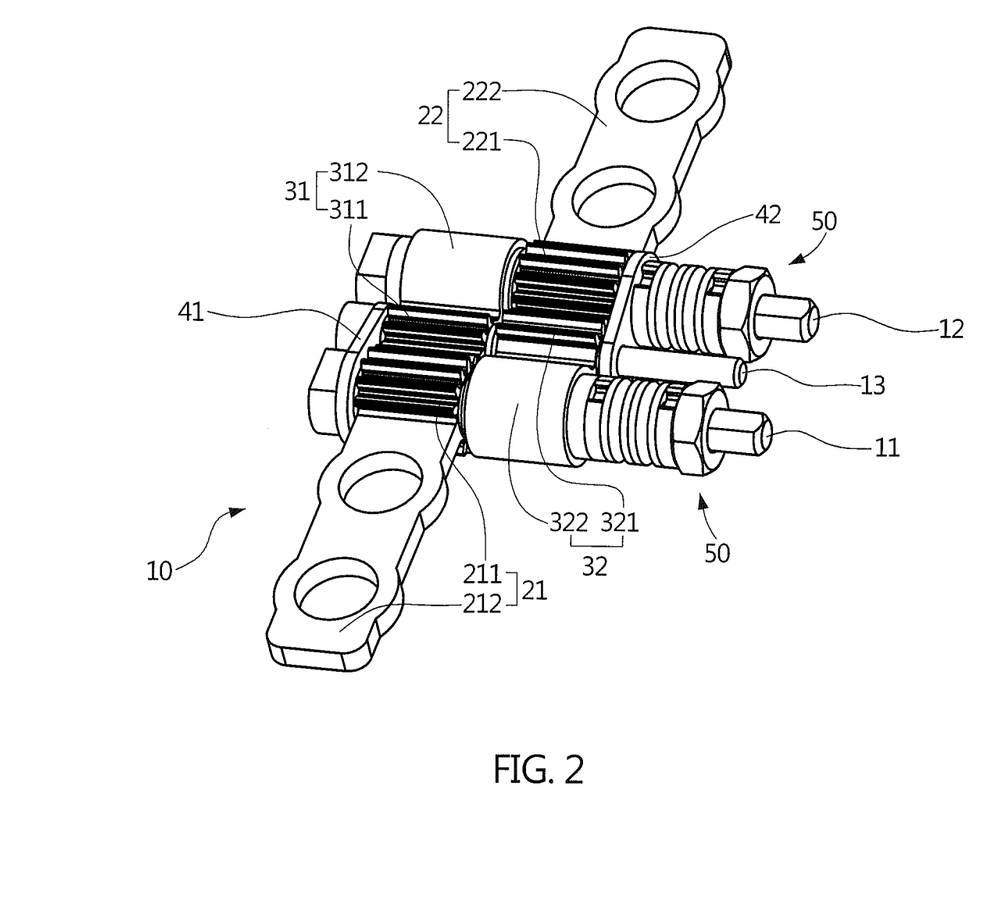
FIG. 2 is a diagram of a triaxial gear-typed hinge assembly in a 180-degree mode according to the preferred embodiment of the present invention.
Figure 3:
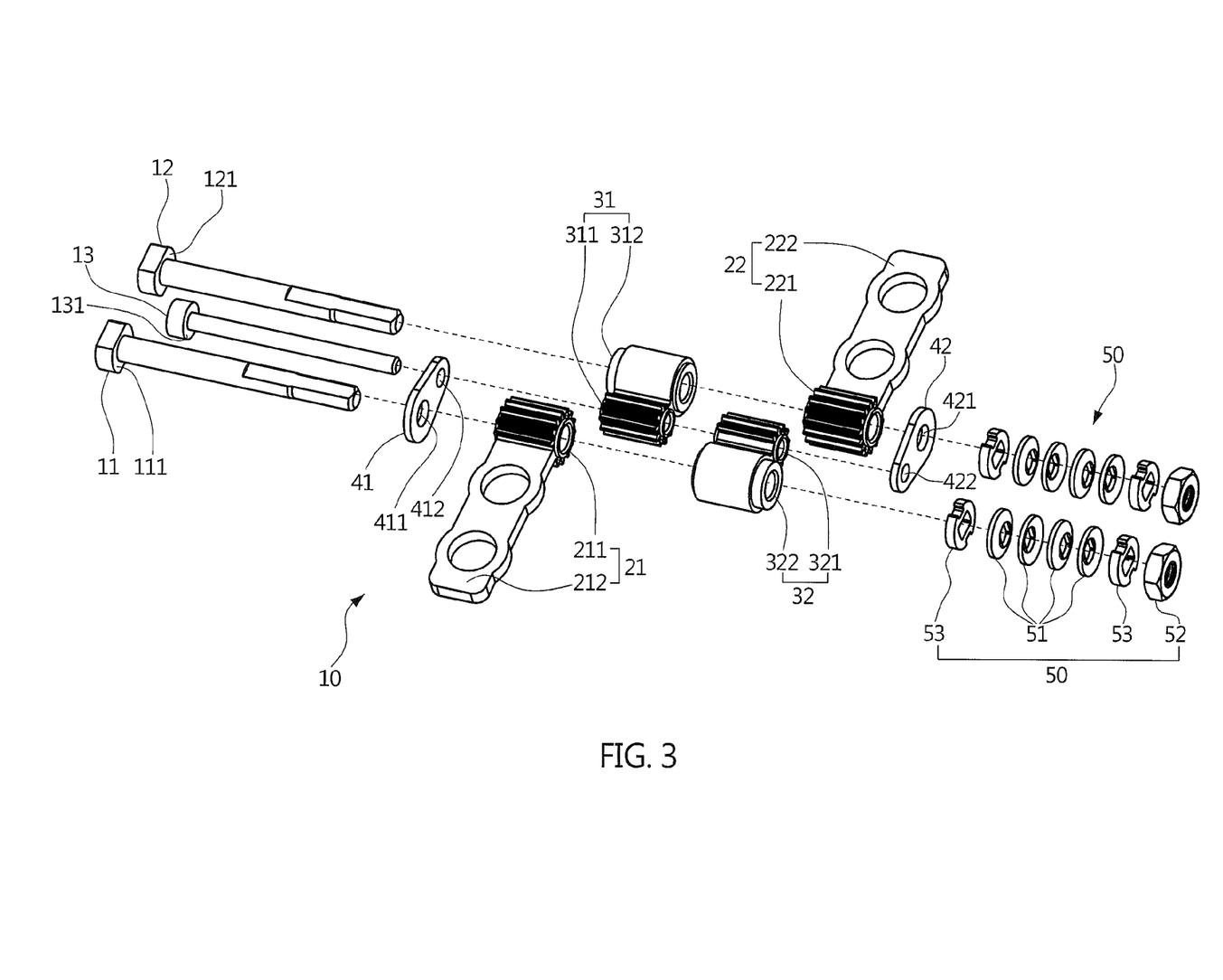
FIG. 3 is an exploded diagram of the triaxial gear-typed hinge assembly according to the preferred embodiment of the present invention.

Please refer to FIG. 2 and FIG. 3. FIG. 2 is a diagram of the triaxial gear-typed hinge assembly 10 according to the preferred embodiment of the present invention. FIG. 3 is an exploded diagram of the triaxial gear-typed hinge assembly 10 according to the preferred embodiment of the present invention. The hinge assembly 10 is pivotally connected between the first body 91 and the second body 92 shown in FIG. 1. The hinge assembly 10 includes a first axle 11, a second axle 12, a third axle 13, a first supporting component 21, a second supporting component 22, a first linking component 31 and a second linking component 32. The first axle 11, the second axle 12 and the third axle 13 are arranged in parallel. The first supporting component 21 includes a first gear 211 and a first fixing arm 212 connected to an end of the first gear 211. The first gear 211 is hinged to the first axle 11, and the first fixing arm 212 is connected to the first body 91. The second supporting component 22 includes a second gear 221 and a second fixing arm 222 fixed to an end of the second gear 221. The second gear 221 is hinged to the second axle 12, and the second fixing arm 222 is connected to the second body 92. The first linking component 31 includes a first linking gear 311 and a first tube 312 fixed to an end of the first linking gear 311. The first linking gear 311 is hinged to the third axle 13 and engaged with the first gear 211. The first tube 312 is hinged to the second axle 12. The second linking component 32 includes a second linking gear 321 and a second tube 322 fixed to an end of the second linking gear 321. The second linking gear 321 is hinged to the third axle 13 and engaged with the second gear 221. The second tube 322 is hinged to the first axle 11.

The assembling sequence of the hinge assembly 10 is: disposing the first gear 211 of the first supporting component 21 on the first axle 11, disposing the first linking gear 311 and the first tube 312 of the first linking component 31 respectively on the third axle 13 and the second axle 12, disposing the second linking gear 321 and the second tube 322 of the second linking component 32 respectively on the third axle 13 and the first axle 11, and disposing the second gear 221 of the second supporting component 22 on the second axle 12. Then, the first gear 211 of the first supporting component 21 is engaged with the first linking gear 311 of the first linking component 31, and the second gear 221 of the second supporting component 22 is engaged with the second linking gear 321 of the second linking component 32. Dimensions of the first gear 211 and the second tube 322 can be greater than dimensions of the first axle 11, so the first gear 211 and the second tube 322 can rotate around the first axle 11. Thus, the first gear 211 and the second tube 322 are hinged to the first axle 11. Dimensions of the first tube 312 and the second gear 221 can be greater than dimensions of the second axle 12, so the first tube 312 and the second gear 221 can rotate around the second axle 12. Thus, the first tube 312 and the second gear 221 are hinged to the second axle 12. Dimensions of the first linking gear 311 and the second linking gear 321 are greater than dimensions of the third axle 13, and the first linking gear 311 and the second linking gear 321 can rotate around the third axle 13. Thus, the first linking gear 311 and the second linking gear 321 are hinged to the third axle 13.

In addition, a first contacting portion 111 can be disposed on an end of the first axle 11, a second contacting portion 121 can be disposed on an end of the second axle 12, and a third contacting portion 131 can be disposed on an end of the third axle 13. The first gear 211 of the first supporting component 21 contacts against the first contacting portion 111, and the first tube 312 and the first linking gear 311 of the first linking component 31 respectively contact against the second contacting portion 121 and the third contacting portion 131.

The hinge assembly 10 further can include a first connecting component 41 and a second connecting component 42. The first connecting component 41 and the second connecting component 42 are arranged in parallel. Two ends of the first connecting component 41 are respectively hinged to the first axle 11 and the third axle 13. Two ends of the second connecting component 42 are respectively hinged to the second axle 12 and the third axle 13. That is, the first connecting component 41 and the second connecting component 42 can be utilized to steady the distance between the first axle 11, the second axle 12 and the third axle 13. Preferably, the first supporting component 21, the second supporting component 22, the first linking component 31 and the second linking component 32 are buckled between the first connecting component 41 and the second connecting component 42. The first connecting component 41 and the second connecting component 42 can be utilized to steady the engagement between the first supporting component 21 and the first linking component 31 and the engagement between the second supporting component 22 and the second linking component 32, and further to steady the contact connection between the first supporting component 21 and the second linking component 32 and the contact connection between the first linking component 31 and the second supporting component 22.

An axial hole 411 and an axial hole 412 are formed on ends of the first connecting component 41. Dimensions of the axial holes 411 and 412 are greater than dimensions of the first axle 11 and the third axle 13, so the axial hole 411 is assembled with the first axle 11 and can be rotated around the first axle 11. The axial hole 412 is assembled with the third axle 13 and can be rotated around the third axle 13. Two ends of the first connecting component 41 are respectively hinged to the first axle 11 and the third axle 13 by the axial holes 411 and 412. An axial hole 421 and an axial hole 422 are formed on two ends of the second connecting component 42. Dimensions of the axial holes 421 and 422 are greater than dimensions of the second axle 12 and the third axle 13. The axial hole 421 is assembled with the second axle 12 to rotate around the second axle 12, and the axial hole 422 is assembled with the third axle 13 to rotate around the third axle 13. Two ends of the second connecting component 42 are respectively hinged to the second axle 12 and the third axle 13 by the axial holes 421 and 422. Further, an end (whereon the axial hole 411 is formed) of the first connecting component 41 is buckled between the first contacting portion 111 and the first gear 211, and the other end (whereon the axial hole 412 is formed) of the first connecting component 41 is buckled between the third contacting portion 131 and the first linking gear 311. An end (whereon the axial hole 421 is formed) of the second connecting component 42 contacts against the second gear 221, and the other end (whereon the axial hole 422 is formed) of the second connecting component 42 contacts against the second linking gear 321.

The hinge assembly 10 further can include two torsion kits 50. The two torsion kits 50 are respectively disposed on the first axle 11 and the second axle 12. Each torsion kit 50 at least includes a resilient component 51 and a fixing component 52. As the torsion kit 50 is disposed on the first axle 11, the resilient component 51 and the fixing component 52 are disposed on the first axle 11, and the resilient component 51 is buckled between the fixing component 52 and the second tube 322. The fixing component 52 can be spaced from the second tube 322 to drive the resilient component 51 to contact against the second tube 322. The resilient component 51 presses over the second tube 322 to generate a friction force, and the second tube 322 is rotated while a torque is greater than the friction force. As the torsion kit 50 is disposed on the second axle 12, the resilient component 51 is buckled between the fixing component 52 and the second gear 221. The resilient component 51 further may be buckled between the fixing component 52 and the second connecting component 42 since the second connecting component 42 exists. Meanwhile, an end (whereon the axial hole 421 is formed) of the second connecting component 42 is buckled between the second gear 221 and the resilient component 51. The fixing component 52 can keep a space from the second gear 221 to drive the resilient component 51 to contact against the second gear 221 (or contact against the second gear 221 through the second connecting component 42), so the resilient component 51 directly presses over the second gear 221 (or press over the second gear 221 via the second connecting component 42) to generate a friction force, and the second gear 221 is rotated while a torque is greater than the friction force.

The torsion kit 50 may include two gaskets 53. The gasket 53 is utilized to decrease damage between the adjacent components. As the torsion kit 50 is disposed on the first axle 11, the two gaskets 53 are disposed on the first axle 11. One of the two gaskets 53 is buckled between the resilient component 51 and the fixing component 52, and the other gasket 53 is buckled between the resilient component 51 and the second tube 322. As the torsion kit 50 is disposed on the second axle 12, the two gaskets 53 are disposed on the second axle 12. One of the two gaskets 53 is buckled between the resilient component 51 and the fixing component 52, and the other gasket 53 is buckled between the resilient component 51 and the second gear 221. The gasket 53 further can be buckled between the resilient component 51 and the second connecting component 42 since the second connecting component 42 exists, and an end (whereon the axial hole 421 is formed) of the second connecting component 42 is buckled between the second gear 221 and the gasket 53.

Operation of the triaxial gear-typed hinge assembly 10 in the present invention is illustrated as follows. FIG. 2 and FIG. 4 to FIG. 6, respectively, are diagrams of the triaxial gear-typed hinge assembly 10 in different operation modes (such as 0 degrees, 90 degrees, 180 degrees and 270 degrees) according to the embodiment of the present invention.

Figure 4:
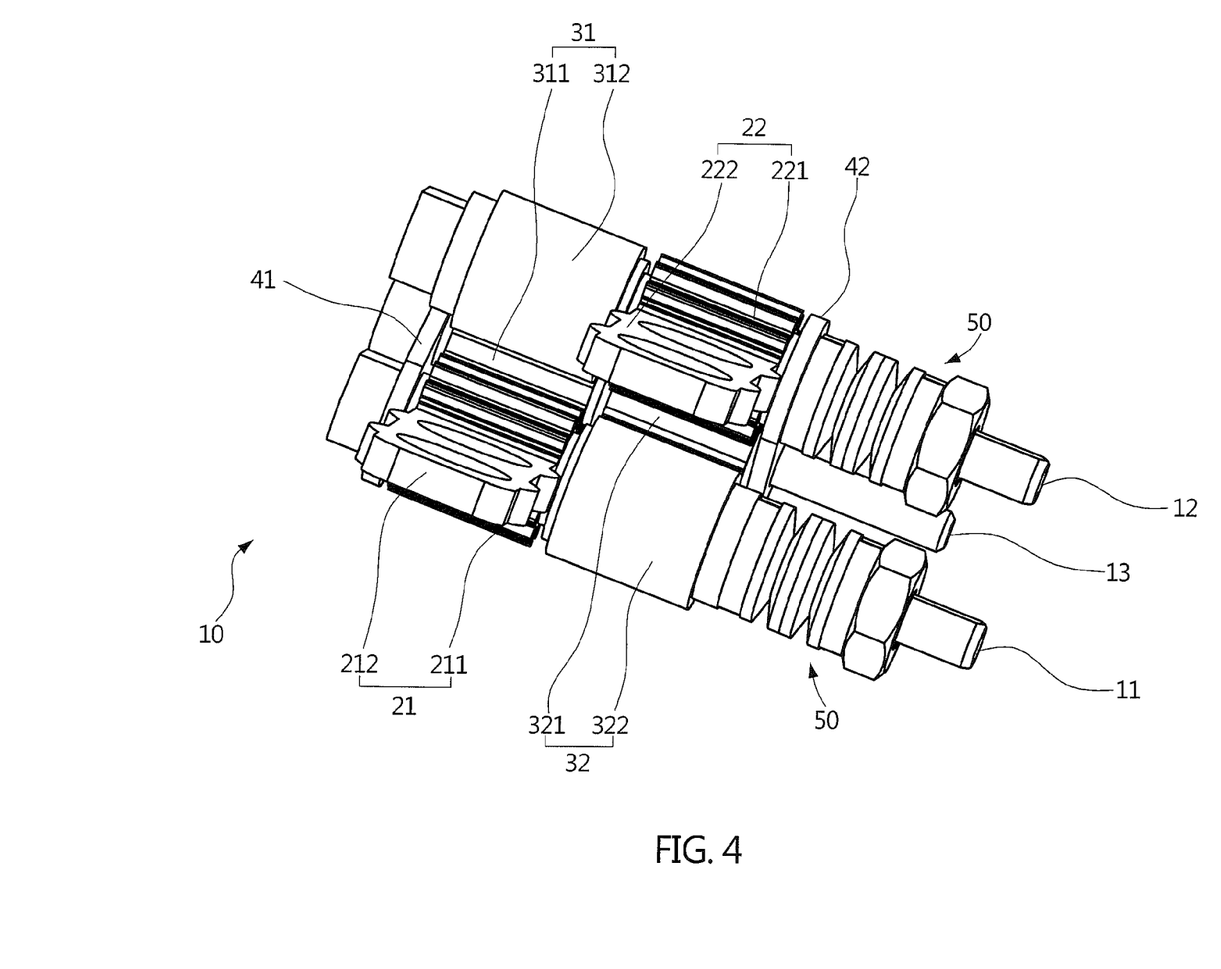
FIG. 4 is a diagram of the triaxial gear-typed hinge assembly in a 0-degree mode according to the preferred embodiment of the present invention.

As shown in FIG. 4, an angle between the first fixing arm 212 and the second fixing arm 222 of the hinge assembly 10 equals 0 degrees, and an angle between the first body 91 and the second body 92 of the electronic device 90 having the hinge assembly 10 equals 0 degrees, accordingly. The hinge assembly 10 and/or the electronic device 90 are switched in a 0-degree mode. When the second body 92 is unfolded relative to the first body 91 at a clockwise direction, the second body 92 rotates the second fixing arm 222 at the clockwise direction, the second gear 221 fixed to the second fixing arm 222 rotates at the clockwise direction, and clockwise rotation of the second gear 221 rotates the second linking gear 321 at a counterclockwise direction. Thus, the second gear 221 can rotate around the second linking gear 321 at the clockwise direction, the second axle 12 whereto the second gear 221 is hinged rotates around the third axle 13 whereto the second linking gear 321 is hinged at the clockwise direction, and the first tube 312 hinged to the second axle 12 rotates around the first linking gear 311 hinged to the third axle 13 at the clockwise direction. Because the first tube 312 is fixed to the first linking gear 311, the first linking gear 311 can rotate around the third axle 13 at the clockwise direction. Clockwise rotation of the first linking gear 311 rotates the first gear 211 at the counterclockwise direction, the first gear 211 rotates the first fixing arm 212 at the counterclockwise direction, and the first fixing arm 212 rotates the first body 91 at the counterclockwise direction. Besides, the clockwise rotation of the first linking gear 311 rotates the first gear 211 at the counterclockwise direction, the first gear 211 rotates around the first linking gear 311 at the counterclockwise direction, which results the first axle 11 whereto the first gear 211 is hinged rotates around the third axle 13 whereto the first linking gear 311 is hinged at the counterclockwise direction, and the second tube 322 hinged to the first axle 11 rotates the second linking gear 321 hinged to the third axle 13 at the counterclockwise direction. Because the second tube 322 is fixed to the second linking gear 321, the second linking gear 321 can rotate around the third axle 13 at the counterclockwise direction, and the second gear 221 is helpful to rotate the second fixing arm 222 and the second body 92 at the clockwise direction.

Figure 5:
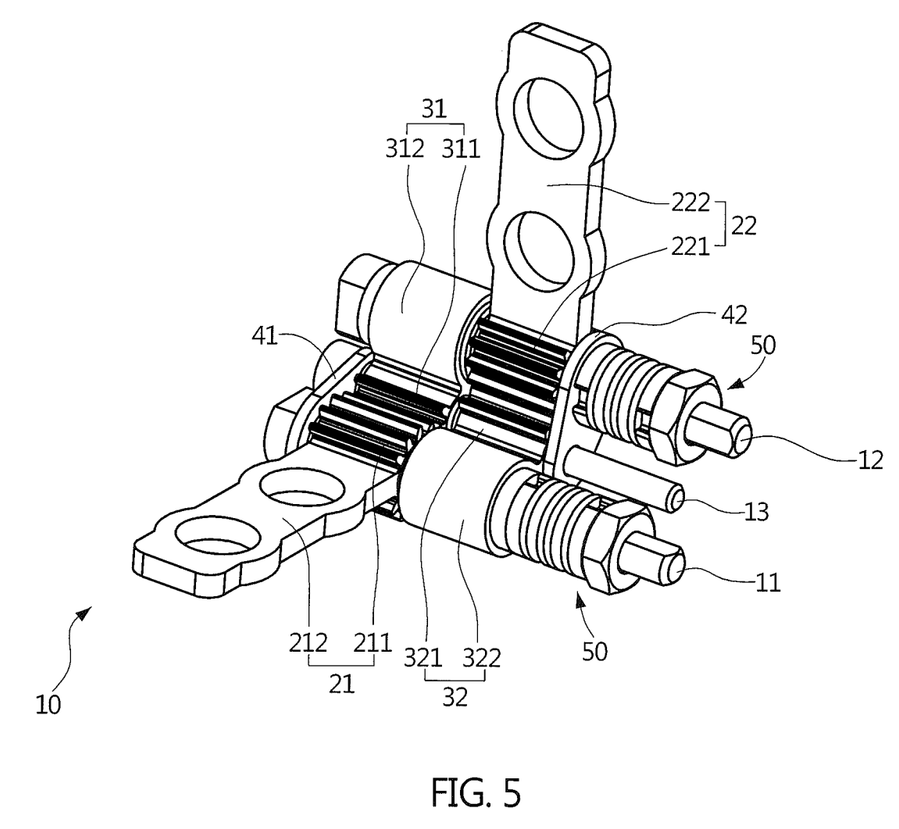
FIG. 5 is a diagram of the triaxial gear-typed hinge assembly in a 90-degree mode according to the preferred embodiment of the present invention.

The teeth number of the first gear 211 is preferably equal to the teeth number of the second gear 221. The teeth number of the first linking gear 311 is preferably equal to the teeth number of the second linking gear 321. When the second body 92 rotates around the third axle 13 at the clockwise direction, motion between the first supporting component 21, the second supporting component 22, the first linking component 31 and the second linking component 32 can rotate the first body 91 around the third axle 13 at the counterclockwise direction to the same angle, so the second body 92 can be easily unfolded relative to the first body 91. When the first body 91 rotates around the third axle 13 at the counterclockwise direction, motion between the first supporting component 21, the second supporting component 22, the first linking component 31 and the second linking component 32 can rotate the second body 92 around the third axle 13 at the clockwise direction to the same angle. Therefore, the hinge assembly 10 and the related electronic device 90 of the present invention have advantages of easy operation and smooth rotation. Further, due to motion between the first supporting component 21 and the second supporting component 22, the hinge assembly 10 may dispose one torsion kit 50 on the first axle 11 or the second axle 12, alternatively. As the second body 92 and/or the first body 91 shown in FIG. 1 are unfolded to 90 degrees, the first fixing arm 212 and the second fixing arm 222 shown in FIG. 4 can be accordingly rotated to each other to 90 degrees, as shown in FIG. 5. The hinge assembly 10 and/or the electronic device 90 are switched in a 90-degree mode.

As shown in FIG. 5, when the hinge assembly 10 or the electronic device 90 is set in the 90-degree mode, the second body 92 can rotate around the third axle 13 at the clockwise direction, the second fixing arm 222 rotates at the clockwise direction, the second gear 221 rotates at the clockwise direction, the second linking gear 321 rotates at the counterclockwise direction, the second gear 221 rotates around the second linking gear 321 at the clockwise direction, and the second axle 12 rotates around the third axle 13 at the clockwise direction. Then, the first tube 312 rotates around the first linking gear 311 at the clockwise direction, so the first linking gear 311 rotates around the third axle 13 at the clockwise direction, the first gear 211 rotates at the counterclockwise direction, the first fixing arm 212 rotates at the counterclockwise direction, the first fixing arm 212 drives the first body 91 to rotate around the third axle 13 at the counterclockwise direction, the first fixing arm 212 and the second fixing arm 222 are rotated to each other and the angle between the first fixing arm 212 and the second fixing arm 222 equals 180 degrees (which means the first body 91 is unfolded relative to the second body 92 to 180 degrees), as shown in FIG. 2, so the hinge assembly 10 or the electronic device 90 is switched in a 180-degree mode. As in the 90-degree mode shown in FIG. 5, the first body 91 can be rotated around the third axle 13 at the counterclockwise direction, or the second body 92 is rotated around the third axle 13 at the clockwise direction and the first body 91 is rotated around the third axle 13 at the counterclockwise direction, so that the first fixing arm 212 can be rotated relative to the second fixing arm 222 to 180 degrees (which angle between the first body 91 and the second body 92 equals 180 degrees), as shown in FIG. 2.

When the hinge assembly 10 or the electronic device 90 is set in the 90-degree mode shown in FIG. 5, the second body 92 can be driven to rotate around the third axle 13 at the counterclockwise direction, the second fixing arm 222 rotates at the counterclockwise direction, the second gear 221 rotates at the counterclockwise direction, the second linking gear 321 rotates at the clockwise direction, and the second gear 221 rotates around the second linking gear 321 at the counterclockwise direction. Then, the second axle 12 rotates around the third axle 13 at the counterclockwise direction, the first tube 312 rotates around the first linking gear 311 at the counterclockwise direction, the first linking gear 311 rotates around the third axle 13 at the counterclockwise direction, the first gear 211 rotates at the clockwise direction, the first fixing arm 212 rotates at the clockwise direction, and the first fixing arm 212 drives the first body 91 to rotate around the third axle 13 at the clockwise direction. Thus, the angle between the first fixing arm 212 and the second fixing arm 222 equals 0 degrees shown in FIG. 4, which means the angle between the first body 91 and the second body 92 equals 0 degrees or the first body 91 closes over the second body 92 shown in FIG. 1. As in the 90-degree mode shown in FIG. 5, the first body 91 can be driven to rotate around the third axle 13 at the clockwise direction, or the second body 92 is driven to rotate around the third axle 13 at the counterclockwise direction and the first body 91 is driven to rotate around the third axle 13 at the clockwise direction simultaneously, and the angle between the first fixing arm 212 and the second fixing arm 222 is switched to 0 degrees shown in FIG. 4, which means the angle between the first body 91 and the second body 92 equals 0 degrees or the first body 91 closes over the second body 92 shown in FIG. 1.

Figure 6:
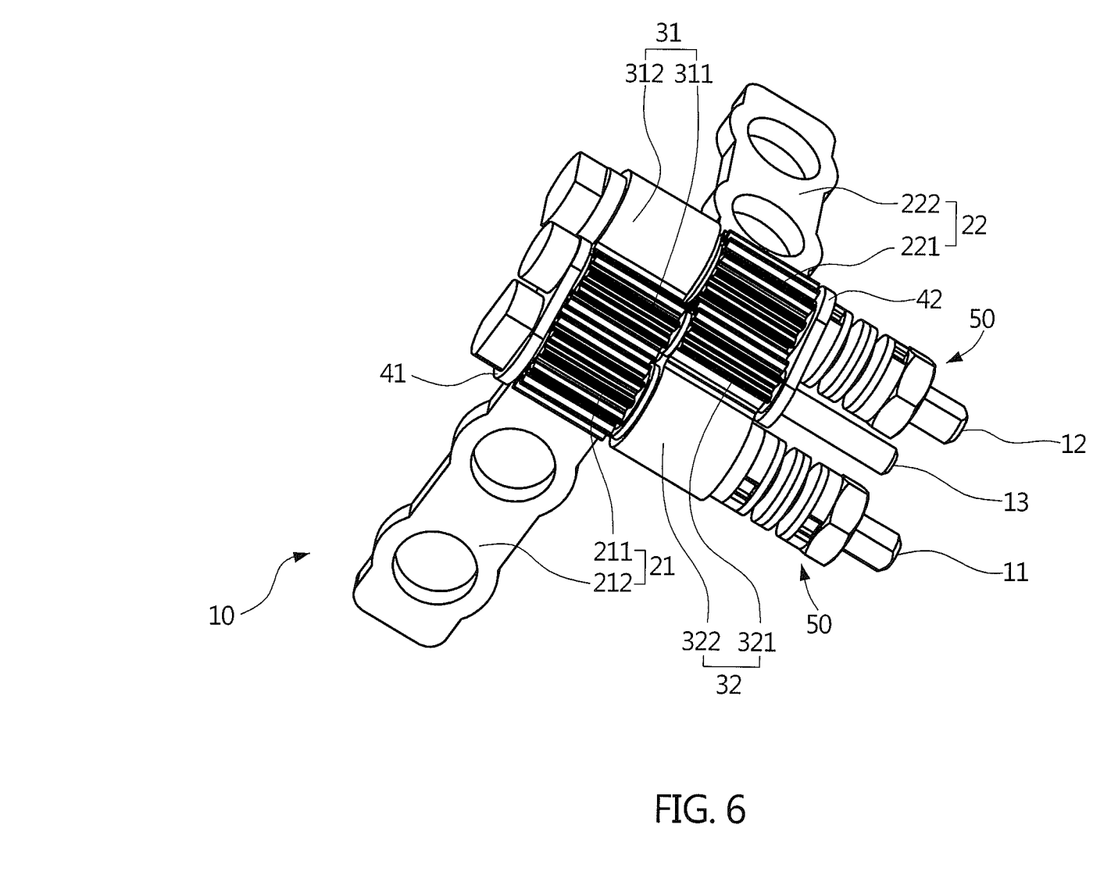
FIG. 6 is a diagram of the triaxial gear-typed hinge assembly in a 270-degree mode according to the preferred embodiment of the present invention.

As shown in FIG. 2, when the hinge assembly 10 or the electronic device 90 is set in the 180-degree mode, the second body 92 can be driven to rotate around the third axle 13 at the clockwise direction and/or the first body 91 is driven to rotate around the third axle 13 at the counterclockwise direction, to rotate the first fixing arm 212 relative to the second fixing arm 222 to 270 degrees (which means the angle between the first body 91 and the second body 92 equals 270 degrees), as shown in FIG. 6, and the hinge assembly 10 or the electronic device 90 is switched in a 270-degree mode. Besides, as in the 180-degree mode shown in FIG. 2, the second body 92 can be driven to rotate around the third axle 13 at the counterclockwise direction and/or the first body 91 is driven to rotate around the third axle 13 at the clockwise direction, to rotate the first fixing arm 212 relative to the second fixing arm 222 to 90 degrees (which means the angle between the first body 91 and the second body 92 equals to 90 degrees), as shown in FIG. 5.

As shown in FIG. 6, when the hinge assembly 10 or the electronic device 90 is set in the 270-degree mode, the second body 92 can be driven to rotate around the third axle 13 at the clockwise direction and/or the first body 91 can be driven to rotate around the third axle 13 at the counterclockwise direction, to rotate the first fixing arm 212 relative to the second fixing arm 222 to 360 degrees (which means the angle between the first body 91 and the second body 92 equals 360 degrees), as shown in FIG. 4, and the hinge assembly 10 or the electronic device 90 is switched in a 360-degree mode. In the meantime, a back of the first body 91 contacts a back of the second body 92, and the electronic device 90 is switched to the tablet computer mode. Furthermore, as in the 270-degree mode shown in FIG. 6, the second body 92 can be driven to rotate around the third axle 13 at the counterclockwise direction and/or the first body 91 can be driven to rotate around the third axle 13 at the clockwise direction, to rotate the first fixing arm 212 relative to the second fixing arm 222 to 180 degrees (which means the angle between the first body 91 and the second body 92 equals 180 degrees), as shown in FIG. 2.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A triaxial gear-typed hinge assembly comprising:
    a first axle;
    a second axle parallel to the first axle;
    a third axle parallel to the first axle and the second axle;
    a first supporting component comprising a first gear hinged to the first axle;
    a second supporting component comprising a second gear hinged to the second axle;
    a first linking component comprising a first linking gear and a first tube fixedly connected to the first linking gear, with the first linking gear hinged to the third axle and engaged with the first gear, with the first tube hinged to the second axle; and
    a second linking component comprising a second linking gear and a second tube fixedly connected to the second linking gear, with the second linking gear hinged to the third axle and engaged with the second gear, with the second tube hinged to the first axle, and with the first and second linking components movable relative to each other.

2. The triaxial gear-typed hinge assembly of claim 1, further comprising:
    a first connecting component, with two ends of the first connecting component respectively hinged to the first axle and the third axle; and
    a second connecting component parallel to the first connecting component, with two ends of the second connecting component respectively hinged to the second axle and the third axle.

3. The triaxial gear-typed hinge assembly of claim 2, wherein the first supporting component, the second supporting component, the first linking component and the second linking component are buckled between the first connecting component and the second connecting component.

4. An electronic device comprising:
    a first body;
    a second body; and
    a triaxial gear-typed hinge assembly of claim 1, wherein the first supporting component further comprises a first fixing arm connected to an end of the first gear and the first body, the second supporting component further comprises a second fixing arm connected to an end of the second gear and the second body.

5. A triaxial gear-typed hinge assembly comprising:
    a first axle;
    a second axle parallel to the first axle;
    a third axle parallel to the first axle and the second axle;
    a first supporting component comprising a first gear hinged to the first axle;
    a second supporting component comprising a second gear hinged to the second axle;
    a first linking component comprising a first linking gear and a first tube connected to the first linking gear, with the first linking gear hinged to the third axle and engaged with the first gear, with the first tube hinged to the second axle; and
    a second linking component comprising a second linking gear and a second tube connected to the second linking gear, with the second linking gear hinged to the third axle and engaged with the second gear, with the second tube hinged to the first axle, wherein a first contacting portion is disposed on an end of the first axle, the first gear contacts against the first contacting portion, a second contacting portion is disposed on an end of the second axle, the first tube contacts against the second contacting portion, a third contacting portion is disposed on an end of the third axle, and the first linking gear contacts against the third contacting portion.

6. The triaxial gear-typed hinge assembly of claim 5, further comprising:
    a torsion kit disposed on the first axle or the second axle, with the torsion kit comprising a resilient component and a fixing component, with the resilient component buckled between the fixing component and the second tube, or between the fixing component and the second gear.

7. The triaxial gear-typed hinge assembly of claim 6, wherein the torsion kit further comprises two gaskets, wherein one of the two gaskets is disposed between the resilient component and the fixing component, wherein another of the two gaskets is disposed between the resilient component and the second tube or between the resilient component and the second gear.

8. The triaxial gear-typed hinge assembly of claim 5, further comprising:
    a first connecting component;
    a second connecting component parallel to the first connecting component; and
    a torsion kit disposed on the first axle or the second axle, with the torsion kit comprising a resilient component and a fixing component;
    wherein an end of the first connecting component is hinged to the first axle and buckled between the first contacting portion and the first gear, the other end of the first connecting component is hinged to the third axle and buckled between the third contacting portion and the first linking gear, an end of the second connecting component is hinged to the second axle and buckled between the second gear and the resilient component, and the other end of the second connecting component is hinged to the third axle and contacts against the second linking gear; and
    wherein the resilient component is buckled between the fixing component and the second tube, or between the fixing component and the second connecting component.

9. The triaxial gear-typed hinge assembly of claim 8, wherein the torsion kit further comprises two gaskets, wherein one of the two gaskets is disposed between the resilient component and the fixing component, wherein another of the two gaskets is disposed between the resilient component and the second tube or between the resilient component and the second connecting component.

* * * * *